United States Patent Office 3,169,902
Patented Feb. 16, 1965

3,169,902
HORTESIN ANTIFUNGAL AGRICULTURAL
COMPOSITIONS AND METHOD
Richard H. Gruenhagen, Blacksburg, Va., assignor to The Dow Chemical Company, Midland, Mich., a corporation of Delaware
No Drawing. Filed Sept. 10, 1958, Ser. No. 760,063
7 Claims. (Cl. 167—22)

This invention is concerned with fungicides and is particularly directed to an agricultural method and composition employing an antimicrobial agent produced as a fermentation product.

In the presently employed procedures for combatting fungal diseases of plants, it has been found necessary to maintain a cover of fungicidal agent on the plant parts susceptible to attack by the organism concerned. Thus, a disadvantage encountered in the use of known agents for controlling fungal diseases of the plant foliage resides in the necessity of applying a fungicidal agent repeatedly in order to maintain coverage of the foliage with an effective amount of such agent as new leaves are put out and undergo expansion. A further disadvantage with most common agricultural fungicides results from the relatively large quantities of material which are required for effective control of plant disease.

It is an object of the present invention to provide a novel agricultural method and composition for the control of plant disease. It is a further object to provide such method and composition embodying the use of an antifungal fermentation product. Yet another object is to provide a method and composition whereby new and expanding foliage of a plant is protected by systemic distribution of the antifungal agent within the plant from foliage previously sprayed into the new or expanding plant parts. Other objects will become apparent from the following specification and claims.

In accordance with the present invention, it has been discovered that plants are protected against the attack of fungal diseases by spraying or otherwise contacting the plant parts with hortesin, an antifungal agent produced as a fermentation product by the cultivation on suitable media of a strain of an organism of the genus Streptomyces. It is among the advantages of the invention that very small amounts of the active antifungal agent provide excellent control of common fungal diseases such as early blight of tomato, bean anthracnose, Dutch elm disease and wheat rust. It is a further advantage of the invention that the novel antifungal agent appears to be distributed by systemic transport within plants sprayed or otherwise contacted with the agent, so that foliage not directly contacted with the spray is nevertheless protected and new foliage elaborated after the application of the agent or old foliage undergoing further expansion after such application, is protected against the attack of fungal disease organisms.

The novel antifungal agent employed in the method and composition of the present invention is produced by cultivating a strain of an organism of the genus Streptomyces aerobically in a deep culture fermentation medium containing sources of carbon, nitrogen and essential trace minerals. Suitable carbon sources for the fermentation medium include glucose, sucrose, molasses, glycerol, mannitol, starch and dextrin. Suitable nitrogen sources include peptone, cornsteep and soybean meal. The novel antifungal agent has been assigned the name, "hortesin," and the strain of Streptomyces producing said agent appears to be a new species and has tentatively been named *Streptomyces mutabilis*. A type culture of said strain has been deposited in the culture collection of the Culture Collection Unit, Northern Utilization Research Branch, Agricultural Research Service, U.S. Department of Agriculture, Peoria, Illinois, under the number NRRL 2528 and will be hereinafter referred to as "strain NRRL 2528."

The active agent, hortesin, is a water-soluble acid substance which is labile under acid conditions and relatively stable in neutral or alkaline solution. Hortesin is substantially ineffective against most bacteria while being highly effective in suppressing the germination and growth of a number of fungi that are the causative agents of many plant diseases. Aqueous solutions of purified hortesin concentrates lose half their antifungal activity in less than one hour at room temperature when maintained at a pH of 4. On the other hand, activity in such aqueous solutions is retained for days or weeks when the pH is adjusted to somewhat over 7. In addition to being soluble in water, hortesin is soluble in 50 percent aqueous acetone and in lower alkanols such as butanols, propanols and ethanols when the latter contain some water, while being substantially insoluble in ether, chloroform, benzene and carbon tetrachloride. Alkali metal salts of hortesin are water-soluble and the agent is generally employed in the form of such salts. Calcium, barium and magnesium ions cause precipitation of the active antifungal agent from aqueous solution.

Hortesin preparations have been found to absorb light in the ultraviolet regions and purified active concentrates thereof show a peak of absorptivity at a wavelength of about 270 millimicrons. The active agent has been found to contain at least carbon, hydrogen, oxygen, nitrogen and, surprisingly, phosphorus as essential constituents of its structure. The phosphorus is present as phosphate radicals and probably in the form of phosphate esters.

In the production of hortesin, standard aerobic deep culture fermentation procedures for the production of antibiotic substances are employed using inoculum of strain NRRL 2528 conditioned by standard subculturing practices. The fermentation is carried out at temperatures of from 24° to 32° C. and preferably at 28° C. Maximum yields of the desired antimicrobial agent are obtained by carrying out the fermentation for a period of about four days at 28° C. In such operations the active antifungal agent can be recovered both from the fermentation beer produced and from the mycelium of the organism. The terms "beer" and "fermentation beer" as employed herein refer to the liquid culture medium obtained on completion of the fermentation as set forth above.

In a representative operation for the production of hortesin, a 30 liter fermenter was charged with 12 liters of medium containing the following components.

| Ingredient: | Percent by weight |
|---|---|
| Dextrin | 2 |
| Wet corn steep | 2 |
| Soybean meal | 2 |
| Sodium chloride | 0.5 |
| Calcium carbonate | 0.2 |
| Tap water, to make 12 liters. | |

The medium was adjusted to a pH of 6.5–6.7 and inoculated with a subculture of strain NRRL 2528. Sterile air was bubbled through the medium and fermentation was carried out at a temperature of 28° C. for a period of four days. The fermentation beer produced was found to be highly effective for the control of tomato early blight.

In carrying out the invention, plant parts may be contacted with the hortesin in any suitable fashion. The exact method of application will vary depending upon the stage of growth of the plant when treated and the particular disease to be controlled. In general, it is preferred to apply the active agent so as to contact one or more absorptive tissues of the plant such as leaves, roots, young, actively growing stems or the active phloem or xylem tissues of woody plants. The expression "plant parts" as employed in the present specification and claims is inclusive of seed as well as roots, stems and foliage of plants. Thus, for example, for the control of damping-off organisms which attack the germinating seed and emerging seedlings, the seed may be soaked in an aqueous solution of the antimicrobial agent before planting, or a dry concentrate of the antimicrobial agent may be intimately mixed with a finely divided inert solid to prepare a dust composition and the latter applied to the seed. Alternatively, seed positioned in a seed bed may be treated in place by drenching the seed bed with a dilute aqueous solution of the antimicrobial agent.

In applications to growing plants, hortesin may be applied as dusts or sprays to absorptive tissues such as the foliage of the plants. Alternatively, the hortesin may be distributed in the soil in close proximity to the roots so that the active agent will be absorbed by the roots and be distributed through the plant. With large woody plants, such as trees, holes may be bored in the trunk and filled with a hortesin solution to contact the active phloem and xylem tissues for absorption into the plant.

In such operations it is not usually necessary that hortesin-containing compositions be applied directly to the fungus-infested tissues of an infected plant since the hortesin is apparently translocated within the plant. Thus, uninfested, absorptive tissues of an infected plant may be contacted with a composition containing a fungicidal amount of hortesin whereby the active antifungal agent is absorbed and translocated to the site of the infection. Alternatively, prophylaxis may be accomplished by applying the hortesin to absorptive tissues of uninfected plants whereby such plants are rendered resistant to subsequent infection with fungus diseases.

For the preparation of sprays, fermentation beers may be employed directly as produced or diluted with water, with or without the addition of a surface-active agent. Alternatively, concentrates produced by evaporation of active beers or by solvent extraction of the beers or mycelia may be employed. In such operations, a dry concentrate containing hortesin may be dispersed directly in water to prepare a spray solution or the concentrate may be admixed with a suitable adjuvant. Thus, such concentrates may be formulated in the form of a solution of the antifungal agent in a suitable solvent or as an intimate mixture of the concentrated agent with a finely divided inert solid carrier and with or without the incorporation of a surface-active wetting or dispersing agent. Such concentrate compositions may then be dispersed in water for the preparation of sprays as required. In a preferred spray composition, the hortesin is employed in dilute aqueous solution together with a nonionic surface-active wetting agent.

Suitable surface-active wetting or dispersing agents for use in the compositions of the invention include alkyl aryl polyether alcohols, polyoxyethylene derivatives of hexitan or hexitol fatty acid esters, alkyl aryl sulfonates, long chain alkyl sulfates and the like. Of these, the nonionic agents are preferred. Suitable finely divided inert solids include diatomaceous earth, pyrophyllite, wood flour, peanut shell flour, and the like. In the preparation of dusts one or more of the aforementioned wetting agents may also be incorporated in the mixture.

The amount of the antifungal agent to be employed will vary depending upon such factors as the plant part to be treated, the stage of growth of the plant and the particular organism to be controlled. In any case, the essential requirement is the application of a fungicidal amount of antifungal agent. When employing fermentation beers directly, good results have been obtained when using from one to ten percent of the active beer in aqueous compositions with or without the addition of a surface-active agent. With dry concentrates of hortesin, the dosage will vary depending upon the amount of active antifungal agent in the concentrate. Excellent disease control has been obtained with as little as 1 part by weight of dry concentrate per million parts by weight of aqueous composition applied to the plants where the dry concentrate contained at most about 10 to 15 percent by weight of the active antifungal agent. Thus as little as 0.1 part of hortesin per million parts of spray composition is effective in the control of plant disease.

The following examples illustrate the invention but are not to be construed as limiting the same.

*Example 1*

A beer produced by deep fermentation by strain NRRL 2528 of Streptomyces was filtered from the mycelium, diluted with tap water and mixed with a wetting agent to produce compositions containing 10 percent and 1 percent by volume of the beer and 250 parts by weight of wetting agent per million parts of composition. The wetting agent employed was Triton X–155, identified as an alkyl-aryl polyether alcohol. The resulting compositions were sprayed with an atomizing spray nozzle using air pressure at 20 pounds per square inch on young tomato plants, 2 to 4 inches high. The application was carried out so as to give thorough coverage of both surfaces of the leaves of the plants without appreciable run-off. Following the application, the plants were allowed to dry and were then inoculated by spraying with a suspension of viable spores of *Alternaria solani*. Untreated tomato plants of the same size were similarly inoculated to serve as checks. Immediately following the inoculation, all plants were placed in a moist chamber and maintained at 70° F. under saturated humidity conditions for 24 hours. Thereafter, the plants were placed in a shaded greenhouse for 48 hours and then observed for the development of early blight lesions caused by the Alternaria organism. It was found that many early blight lesions had developed on the untreated check plants whereas the infection was controlled to the extent of 92 percent and 72 percent on the plants sprayed with the compositions containing 10 percent and 1 percent by volume, respectively, of the fermentation beer.

*Example 2*

A number of individually potted tomato plants were sprayed with the compositions of Example 1. Thereafter, one group of plants was immediately inoculated and incubated as in Example 1. Other groups of the plants were maintained under good growing conditions. Five days after the spray application, one of the latter groups of plants and 8 days after spraying another of said groups were inoculated and incubated as before. The control of early blight obtained is shown in the following table.

| Days elapsed between spraying and inoculation: | Percent control of early blight |
|---|---|
| 0 | 98 |
| 5 | 95 |
| 8 | 83 |

*Example 3*

16 liters of beer produced by deep culture fermentation of strain NRRL 2528 was filtered to separate the mycelium and the latter was extracted 3 times with approximately 2 liter portions of hot aqueous 50 percent acetone solution. The aqueous acetone extracts were combined and evaporated to dryness to produce a concentrate of hortesin. The latter was dissolved in aqueous 10 percent acetone solution to produce a series of spray compositions containing 1 part by weight of the concentrate per million parts of composition together with varying amounts of nonionic surface-active agents. Following the procedure of Example 1, the resulting compositions were sprayed on young tomato plants and the latter inoculated with Alternaria spores and incubated. Similar aqueous acetone compositions containing the surface-active agents without the hortesin and the hortesin without surface-active agent were similarly applied and the plants inoculated and incubated for comparison.

The results are summarized in the following table wherein the concentrations of surface-active agent and of hortesin concentrate are in parts by weight per million parts of aqueous composition.

| Surface-Active Agent | Concentration of Surface-active Agent, p.p.m. | Concentration of Hortesin Concentrate, p.p.m. | Percent Control of Early Blight |
|---|---|---|---|
| Atlox 8916P | 100 | none | 2 |
| Do | 200 | none | 7 |
| Do | 100 | 1.0 | 98 |
| Triton X-155 | 100 | none | 2 |
| Do | 200 | none | 5 |
| Do | 100 | 1.0 | 92 |
| Atlox 1045A | 100 | none | 0 |
| Do | 200 | none | 0 |
| Do | 100 | 1.0 | 87 |
| None | | 1.0 | 87 |

The surface-active agents are identified as follows:

Atlox 8916P—Polyoxyethylene sorbitol esters of mixed fatty and resin acids.
Triton X-155—Alkylaryl polyether alcohol.
Atlox 1045A—Polyoxyethylene sorbitol oleate-laurate.

*Example 4*

The dry concentrate of hortesin described in Example 3 was dissolved in water to prepare a series of aqueous solutions containing varying amounts of said concentrate. Nasturtium seed were soaked in the resulting solutions for one-half hour and thereafter planted in a loam soil high in organic matter and infested with damping-off organisms including Pythium, Fusarium and Rhizoctonia species. The same number of nasturtium seed were soaked in tap water and planted in the above soil to serve as checks. The seed bed area was maintained under moist conditions in a partially shaded greenhouse for a period of ten days. At this time, it was observed that nasturtium plants had emerged as follows.

| Concentration of hortesin concentrate, parts per million: | Percent of nasturtium seed emerging |
|---|---|
| 20 | 60 |
| 200 | 80 |
| 2000 | 85 |
| Untreated check | 50 |

In addition to the improved emergence obtained with the above seed treatment, it was observed that the plants emerging from the treated seed made more vigorous growth than those from the untreated checks.

*Example 5*

Ten liters of fermentation beer produced by deep culture fermentation of strain NRRL 2528 was filtered from the mycelium and extracted with four liters of 1-butanol. The butanol extract was separated and evaporated to a volume of 500 milliliters. The resulting solution was dried and chilled in a refrigerator overnight, a precipitate being formed thereby. The precipitate was collected, washed with dry methanol and dried to produce a dry concentrate of the desired antifungal agent, hortesin. The latter was dissolved in water together with Triton X-155 to produce spray compositions containing one and ten parts by weight of the hortesin concentrate per million parts of composition. Each composition contained 250 parts of Triton X-155 per million as wetting agent. The compositions were sprayed on tomato plants inoculated and incubated as in Example 1. It was found that early blight disease was controlled substantially completely by both compositions.

*Example 6*

Eight liters of fermentation beer produced by deep culture fermentation of strain NRRL 2528 of Streptomyces was filtered from the mycelium and evaporated to dryness to produce a dry concentrate of hortesin. The latter was dissolved in water to prepare compositions containing 10 and 100 parts by weight of the concentrate per million parts of composition and the latter sprayed on tomato plants as in Example 1. Following inoculation with Alternaria spores and incubation as in the preceding examples, it was found that early blight disease was controlled to the extent of 87 percent and 97 percent with the compositions containing 10 parts per million and 100 parts per million, respectively, of the antimicrobial concentrate.

*Example 7*

A dry concentrate was prepared by evaporation of a fermentation beer produced by deep fermentation of the microorganism strain NRRL 2528. The concentrate was obtained in the amount of 30 milligrams of solid concentrate per milliliter of the original beer. A composition was prepared by dissolving the above concentrate in water in the amount of 1000 parts by weight per million parts of composition. This composition was applied to young bean and tomato plants by dipping a single leaf of each plant in the composition. Thereafter, the treated plants were maintained under good growing conditions for three days and then inoculated with suspensions of spores of disease organisms. The tomato plants were inoculated with *Alternaria solani* spores and the bean plants with spores of *Colletotrichum lindemuthianum*, the causative organism for bean anthracnose. The inoculation and subsequent incubation of the plants was carried out by the procedure of Example 1. Two days after the inoculation, the tomato plants were observed for early blight lesions. It was found that early blight was controlled to the extent of 100 percent on the dipped leaves and 75 percent on other leaves of the plants having a single leaf dipped. About 4 days after the inoculation, the bean plants were observed for evidence of infection with bean anthracnose. It was found that the latter disease was controlled to the extent of 100 percent and 97 percent on the dipped leaf and on other leaves of the same plant, respectively.

*Example 8*

Following the procedure of Example 7, single leaves of pinto bean plants were dipped in an aqueous composition containing 100 parts by weight of the concentrate of Example 3 per million parts of composition. The bean plants were maintained under good growing conditions for about 3 days and then inoculated by spraying with an aqueous suspension of viable spores of *Uromyces appendiculatus*, the caustive organism for the bean rust disease. The spore suspension contained sufficient Tween 20 to provide good wetting of the spores and leaves. Following the inoculation, the bean plants were maintained in a moist chamber at 70° F. and 95–100 percent relative humidity for about 20 hours. Untreated bean plants were similarly inoculated and incubated to serve as checks. After incubation, all the plants were transferred to a shaded greenhouse. Several days later it was observed that the check plants were heavily infested with bean rust lesions while both the dipped and undipped leaves of the treated bean plants were completely free of such lesions.

*Example 9*

An elm tree about 16 inches in diameter, breast high, had typical foliage symptoms of Dutch elm disease in the fall of the year. Three other elms, all within 40 feet of the location of the above, had previously been killed by the Dutch elm disease. In April, following the observations on the tree showing symptoms, half-inch holes were bored at a downward angle into the trunk of said tree at intervals of 6 to 8 inches around the circumference thereof. A dispersion of a wettable powder concentrate of hortesin was poured into the holes in an amount to provide a total of 12 grams of hortesin concentrate in the tree and the holes were plugged with corks. The wettable powder was prepared by grinding a crude hortesin concentrate with an equal weight of Georgia clay (Diluex) in a hammermill. On examination in September following the above treatment, the treated tree looked perfectly normal and no longer had diseases symptoms.

*Example 10*

The wettable powder of Example 9 was dispersed in water to provide a spray composition containing 150 parts by weight of the crude hortesin concentrate per million parts of composition. About 6.5 gallons of said spray composition was applied by means of a mist-blower sprayer to cover the foliage of an elm tree, measuring 10–12 inches, breast high. This tree showed symptoms of Dutch elm disease and cultures taken from the tree were positive for *Ceratostomella ulmi,* the causative organism in said disease. The cultures were taken on July 20 and the spray applied July 26. About one month after spraying, the tree was observed and resampled for culturing. At this time the tree's condition was good although trace symptoms of the disease were still present and the culture proved to be positive for *C. ulmi.* On examination on September 4, the tree was found to be in excellent condition, free of symptoms, and cultures taken at this time were negative. On August 24 of the following year the tree was in excellent condition and was diagnosed by a forester as completely recovered.

This application is a continuation-in-part of a copending application, Serial No. 594,363, filed June 28, 1956, now abandoned.

I claim:

1. A method for the control of fungal disease of plants which comprises contacting plant parts with an anti-fungal agent produced as an aerobic, deep culture fermentation product by strain NRRL 2528 of Streptomyces, said agent being employed in the form of an aqueous composition containing at least about 0.1 part by weight of a concentrate of said agent per million parts of composition.

2. A method for the control of fungal disease of plants which comprises contacting uninfested absorptive tissues of a plant infected with a fungal disease with a fungicidal amount of an antifungal agent produced as an aerobic, deep culture fermentation product by strain NRRL 2528 of Streptomyces.

3. A method of prophylaxis for the prevention of fungal diseases of plants which comprises contacting absorptive tissues of uninfected plants with a fungicidal amount of an antifungal agent produced as an aerobic, deep culture fermentation product by strain NRRL 2528 of Streptomyces.

4. A composition for the control of fungal diseases of plants which comprises an antifungal agent produced as an aerobic, deep culture fermentation product by strain NRRL 2528 of Streptomyces in intimate mixture with a surface-active agent.

5. A composition according to claim 4 wherein the surface active agent is a non-ionic surface active agent.

6. A composition for the control of fungal diseases of plants which comprises a surface-active agent in intimate mixture with an antifungal agent produced as an aerobic, deep culture fermentation product by strain NRRL 2528 of Streptomyces, said agent being a non-dialyzable acidic substance, labile in acid and stable in neutral or alkaline aqueous solution, soluble in water, butanol and 50 percent aqueous acetone, substantially insoluble in ether, chloroform, benzene and carbon tetrachloride, forming water-soluble alkali metal salts and being precipitated from aqueous solution by calcium, barium and magnesium ions, containing chemically-combined carbon, hydrogen, oxygen, nitrogen and phosphorus as essential constituents of its structure and absorbing ultra-violet light with a maximum absorptivity at a wave length of about 270 millimicrons.

7. A composition for the control of fungal diseases of plants which comprises a finely-divided inert solid in intimate mixture with an antifungal agent produced as an aerobic, deep culture fermentation product by strain NRRL 2528 of Streptomyces, said agent being a non-dialyzable acidic substance, labile in acid and stable in neutral or alkaline aqueous solution, soluble in water, butanol and 50 percent aqueous acetone, substantially insoluble in ether, chloroform, benzene and carbon tetrachloride, forming water-soluble alkali metal salts and being precipitated from aqueous solution by calcium, barium and magnesium ions, containing chemically-combined carbon, hydrogen, oxygen, nitrogen and phosphorus as essential constituents of its structure and absorbing ultra-violet light with a maximum absorptivity at a wave length of about 270 millimicrons.

References Cited in the file of this patent

UNITED STATES PATENTS

| 2,657,170 | Keitt et al. | Oct. 27, 1953 |
| 2,972,569 | Oliver et al. | Feb. 21, 1961 |

OTHER REFERENCES

Leben: Phytopathology, July 1953, pp. 391–394.

Amman et al.: Phytopathology, October 1955, pp. 559–563.

Waksman: Bacteriological Reviews, 21:1, March 1957.

Pridham et al.: Applied Microbiology, 6:1, pp. 52–79, esp. p. 69, January 1958, citation of Gauze, 1957, Problems of Classification of Actinomycetes Antagonists, National Press of Medical Literature, Medzig, Moscow, USSR, pp. 164 and 166 relied upon.

Sneath: J. Gen. Microbiology, vol. 17, pp. 184–200, esp. p. 200.